United States Patent [19]

Baginski et al.

[11] Patent Number: 5,331,862
[45] Date of Patent: Jul. 26, 1994

[54] LINEAR DRIVE FOR CONVERTING A ROTATIONAL DRIVE MOVEMENT INTO A LINEAR OUTPUT MOVEMENT

[75] Inventors: Ralf Baginski, Neetze; Roland Felkai, Bremen, both of Fed. Rep. of Germany

[73] Assignee: ERNO Raumfahrttechnik GmbH, Bremen, Fed. Rep. of Germany

[21] Appl. No.: 969,406

[22] Filed: Oct. 30, 1992

[30] Foreign Application Priority Data

Nov. 2, 1991 [DE] Fed. Rep. of Germany ....... 4136119

[51] Int. Cl.$^5$ ............................................. F16H 55/52
[52] U.S. Cl. .................................................. 74/89.22
[58] Field of Search ............................ 74/89.21, 89.22

[56] References Cited

U.S. PATENT DOCUMENTS

| | | | |
|---|---|---|---|
| 2,334,981 | 11/1943 | Ackley | 74/89.22 |
| 2,884,788 | 5/1959 | Clark | 74/89.22 X |
| 3,611,819 | 10/1971 | Muller et al. | 74/89.22 |
| 3,872,960 | 3/1975 | Gabor | 74/89.22 X |
| 4,524,520 | 6/1985 | Levy | 74/89.22 X |

FOREIGN PATENT DOCUMENTS

| | | |
|---|---|---|
| 3836372 | 5/1990 | Fed. Rep. of Germany . |
| 56-80553 | 7/1981 | Japan ............................ 74/89.22 |
| 57-22449 | 2/1982 | Japan ............................ 74/89.22 |
| 57-103959 | 6/1982 | Japan ............................ 74/89.22 |
| 60-114440 | 6/1985 | Japan ............................ 74/89.22 |

Primary Examiner—Allan D. Herrmann
Attorney, Agent, or Firm—W. G. Fasse; W. F. Fasse

[57] ABSTRACT

A linear drive for use in air and space travel converts the rotational drive of an electromotor into a linear motion of a runner which is secured to at least one flexible coupling member. The flexible coupling member runs around at least one guide member at one end thereof, and around a drive wheel driven by the electric motor at the other end of the flexible coupling member. The rotating drive wheel and the guide member both change the movement direction of the flexible coupling member, whereby the runner can run back and forth between the drive wheel and the guide member.

13 Claims, 3 Drawing Sheets

LINEAR DRIVE FOR CONVERTING A ROTATIONAL DRIVE MOVEMENT INTO A LINEAR OUTPUT MOVEMENT

FIELD OF THE INVENTION

The invention relates to a linear drive that converts a rotational drive input movement into a linear output movement, for example, of a runner that moves linearly back and forth. Such drives are especially useful in aircraft and spacecraft.

BACKGROUND INFORMATION

Linear drives of the type described above include an electromotor that provides the rotational drive movement, for example, or a drive wheel or pulley, and a runner that is secured to a flexible member running around a guide member such as a guide pulley. The electric motor runs in one direction for moving the runner one linear direction and the rotational direction of the electric motor is reversed for moving the runner in the opposite direction.

It is also known to drive a spindle by means of an electromotor. The runner has a female threading that engages the threading of the spindle, whereby the runner can be positioned anywhere along the length of the spindle. In known linear drives, the electric motor is frequently arranged in the area of one end of the linear drive, whereby such an arrangement in combination with the available installation space for a given installation length of the linear drive, reduces the available stroke range of the linear movement of the runner. Another disadvantage of conventional drives this type is seen in that the electromotor frequently extends substantially to the side of the longitudinally movable runner so that depending on the arrangement of the motor a substantial installation space is required in the direction of the longitudinal movement of the runner or in the direction across the movement direction, or even in both directions. Such an installation space or volume does not pose a substantial problem on the ground in the workshop or assembly sheds. However, when such drives are to be used in air or spacecraft, the available installation volume is very limited, whereby the installation of such Linear drives poses substantial difficulties. As a result, heretofore such linear drives have been used on a rather limited scale in air and spacecraft.

German Patent Publication (DE) 3,836,372 A1 (Holtkamp) published May 3, 1990 discloses an apparatus for converting the rotational movement of a spindle into a longitudinal movement of a runner or trip dog, whereby the spindle is constructed as a flexible endless tension spindle having an external threading. The spindle passes through a hollow shaft that is rotated by an electric motor and which is fixed against axial displacement. The hollow snarl is equipped with a drive ball that engages into the threading of the spindle. Thus, when the hollow shaft rotates, the spindle travels axially through the motor. This conventional construction requires that one half of the motor diameter is located on each side of the longitudinal spindle axis. Additionally, there must be space outside the motor for the return path of the flexible spindle. Thus, a compact construction is possible only within limits.

OBJECTS OF THE INVENTION

In view of the above it is the aim of the invention to achieve the following objects singly or in combination:
- to construct a linear drive of the type described above in such a way that the required installation volume is optimally reduced, so that the use of such a drive in aircraft and spacecraft is more easily realized than heretofore;
- to arrange the electric motor which provides the rotatinal drive that is to be converted into a linear movement, between the two runs of a flexible motion coupling member;
- to guide the flexible coupling member along any desired path and around a number of corners;
- to minimize any slip between the rotational drive motion and the linear output motion to assure a precise relationship between the two motions; and
- to provide a construction in which components subject to wear and tear are easily exchanged.

SUMMARY OF THE INVENTION

The above objects have been achieved according to the invention my the combination of the following features. The flexible coupling member between the rotational output of the electric motor and the linear motion runner is guided around a rotating drive member driven by the electric motor output shaft. The electric motor is arranged between the two runs of the coupling member. The coupling member is guided at its end opposite the driven end by a guide member, e.g. a pulley. The guide members are secured to a guide fall. Preferably, the electric motor is arranged inside the guide rail and the guide members are arranged at the corners of the guide rail.

The coupling member is flexible enough so that it can be guided around a guide member, thereby changing its movement direction. This feature makes it possible to arrange the electric motor where a suitable space is available and to position the guide members in such a way that the runner can be positioned almost in any desired area. A particularly advantageous feature is seen in that the electric motor may, for example, be arranged between the guide members, whereby the entire structural length can be utilized for the stroke or travelling range of the runner. Additionally, the flexibility of the coupling member makes it possible to position the guide members in one or several corners around which the coupling member is travelling, whereby a proper guiding of the coupling member is assured even where very restricted space is available. Another feature of the invention is seen in that the electric motor can be arranged separate from the runner, whereby a respective distance is traversed by the flexible coupling member, and whereby any desired guiding of the coupling member can be used throughout this spacing or distance between the motor and the runner.

The above mentioned arrangement of the electric drive motor between the two legs of the guide rail and inside the two runs of the flexible guide member results in an especially compact construction that does not require any extra space for the arrangement of the guide motor. A lightweight and simple structure results by using a rope or cable for the flexible coupling member that is capable of running around a guide pulley or sheave. The use of pulleys results in a structure that is cost efficient, yet sturdy, especially if the guiding around the motor's drive shaft is also accomplished by a drive pulley.

In the simplest embodiment of the invention, the flexible coupling member runs around one guide member and around one drive member, both of which may be pulleys and at least one of which is secured to a guide rail. Even the use of four guide members such as guide pulleys, does not require any more space than the use of one guide pulley if the four guide pulleys are arranged so that one of the four guide pulleys is mounted at each corner of a rectangle, whereby the rectangle may be formed by a guide rail.

In order to avoid any slip between the drive member and the coupling member to thereby assure the required positioning precision of the runner, the invention suggests winding the coupling member in the form of a rope or cable with several turns around the drive wheel, whereby slipping is eliminated.

According to the invention it is possible to position the runner even in locations which are hard to access and which are small by providing several relatively small guide members that detour the coupling member. The runner may be an integral element of the coupling member.

Slipping between the runner and the coupling member is prevented by rigidly securing the runner to the coupling member. An easy exchange of components of the present linear drive that are subject to wear and tear is assured my using an least two motion direction changing guide wheels as the guide members to provide a roller guide for the coupling member. This feature also facilitates making changes in the present linear drive.

An especially compact embodiment results by extending the longitudinal axis of the electric motor in the direction of the longitudinal axis of a guide rail that carries the guide members.

BRIEF DESCRIPTION OF THE DRAWINGS

In order that the invention may be clearly understood, it will now me described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
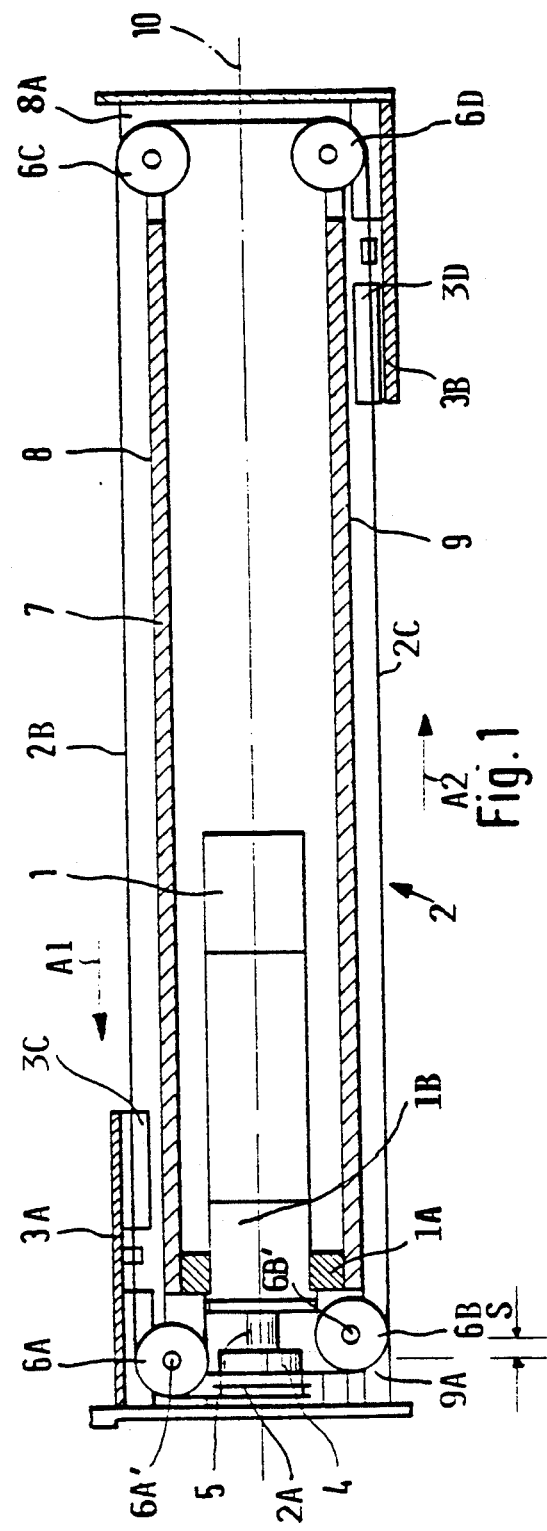
FIG. 1 is a sectional axial view through a linear drive according to the invention, having four guide pulleys and one drive pulley, whereby the electric drive motor is arranged between the two legs of a guide rail to which the guide pulleys are secured.

Referring to FIG. 1, the present linear drive comprises an electric motor 1 also referred to as electromotor mounted coaxially with regard to a central longitudinal axis 10 of the system. The axis 10 is also the central axis symmetry of a support and guide rail 7 having an upper rail section 8 and a lower rail section 9 forming a mounting. A mounting ring 1A holds the motor 1 in the rail 7. The motor 1 may be combined with a gear 1B, such as a reduction gear that has an output shaft 5 for driving a drive pulley or wheel 4. A coupling member 2 in the form of a rope or cable sufficiently flexible to run around guide members such as pulleys 6, connects at least one runner 3 to the output or drive pulley 5. Preferably, the coupling member 2 forms several windings 2A around the drive pulley 5 to avoid slipping. For this purpose, the guide pulleys 6A and 6B are slightly axially displaced by a spacing S relative to each other, whereby the displacement corresponds to the spacing between the run-in and the run-out of the coupling member onto and from the drive pulley 4. The guide pulleys 6A and 6B have rotational axes 6A' and 6B' respectively and the spacing S is measured between these axes 6A' and 6B' as shown in FIG. 1.

The coupling member 2 forms an upper run 2B and a lower run 2C. For this purpose, the upper run is guided by the pulley 6A and a further pulley 6C. The lower run 2C is guided by the pulley 6B and a further pulley 6D. As shown, the pulleys 6A, 6B, 6C, and 6D are rotatably mounted in corners of the guide rail 7, thereby forming substantially a rectangle, except for the axial spacing between the pulleys 6A and 6B, whereby a quadrangle results. As mentioned, the electric motor 1 is coaxially arranged between the upper and lower rail sections 8 and 9 of the guide rails 7. Preferably the rail sections 8, 9 and thus the runs 2B and 2C run in parallel to each other and in parallel to the central axis 10 which is a first longitudinal axis for the mounting or guide rail 7 and a second longitudinal axis for the motor 1. This arrangement is particularly compact and space saving. Thus, the motor is also arranged between the runs 2B, 2C.

Instead of using a rope or cable for the coupling member 2, it is also possible to use a belt, a toothed belt, or even a chain. However, in these instances it may be necessary to provide, for example a bevel gear between the output shaft 5 and the respective drive sprocket in order to maintain the coaxial mounting of the motor inside the guide rail 7. A flexible drive chain, however, could run around a sprocket that is directly driven by the shaft 5.

FIG. 1 shows that two runners 3A and 3B are rigidly secured to the coupling member 2. More specifically, the upper runner 3A is rigidly secured to the upper run 2B of the coupling member 2. The lower runner 3B is rigidly secured to the lower run 2C of the coupling member 2. As shown, each runner is in its respective end position. This end position has been reached with the upper run 2B moving to the left as indicated by the arrow A1 and the lower run 2C running to the right as indicated by the arrow A2. The movement direction is reversed by reversing the drive direction of the motor 1. For precision, each runner 3A and 3B may have a guide section 3C and 3D engaging a respective guide groove 8A, 9A of the guide rail 7 with a sliding contact. The runners may be an integral element of the respective run of the coupling member 2.

Figure 2:
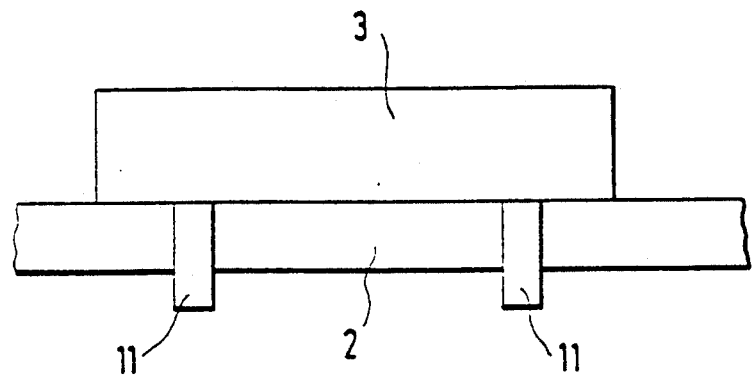
FIG. 2 is a schematic illustration showing a rigid connection between a runner and one run of a flexible coupling member, such as a rope or cable.

FIG. 2 shows a rigid connection of the runner 3 with the coupling member 2 by two mounting elements 11, such as mounting clamps or screws or the like.

Figure 3:
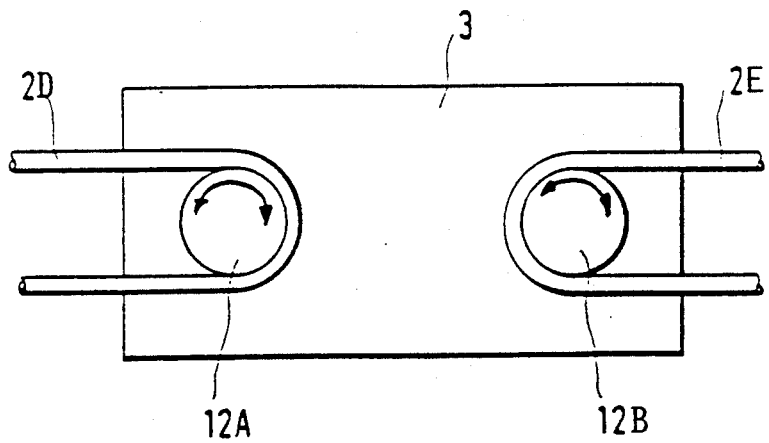
FIG. 3 shows an embodiment in which a runner is secured with two guide pulleys to two respective loops formed by the flexible guide member in the form of a rode or cable.
Figure 4:
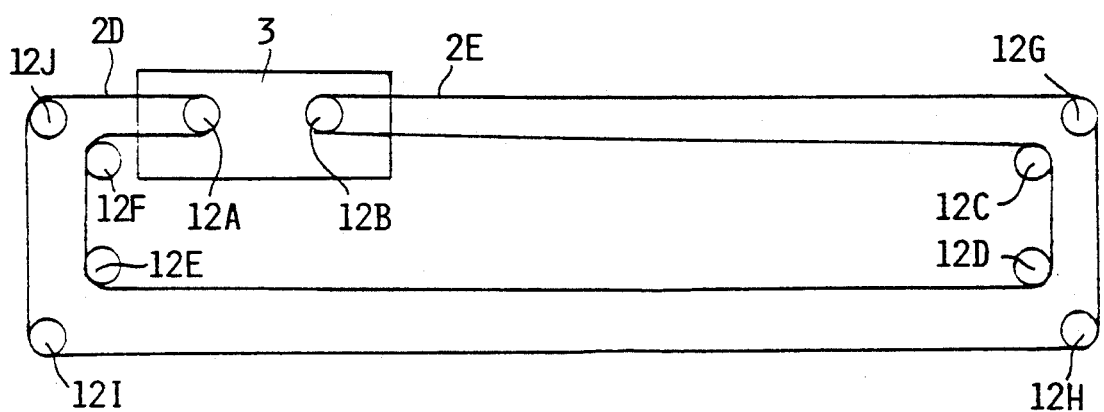
FIG. 4 is a more detailed view of the embodiment of FIG. 3.

FIGS. 3 and 4 show the mounting of a runner 3 by means of two direction reversing guide pulleys 12A and 12B rotatably secured to the runner 3. The coupling member 2 forms two loops 2D and 2E around these guide pulleys 12A and 12B respectively. Additional guide pulleys 12C to 12J participate in the formation of these loops 2D, 2E.

The direction reversing guide members 12A, 12B may, depending on the type of coupling member used, be cylindrical pulleys, V-groove pulleys, gear teeth pulleys or sprocket wheels. The direction reversing pulleys may also be equipped with gear teeth that mesh with a toothed rack for the drive operation.

Although the invention has been described with reference to specific example embodiments it will be appreciated that it is intended to cover all modifications and equivalents within the scope of the appended claims.

What we claim is:

1. A linear drive, particularly for use in an aircraft or spacecraft, comprising an electromotor for providing a rotational power output, a runner for performing a linear movement, and means coupling said runner to said rotational power output of said electromotor for converting rotation into said linear movement, said coupling means comprising a flexible member and guide means supporting said flexible member at least at one location away from said electromotor and so that said flexible member extends in a first plane, said flexible member positioning said runner, said guide means changing the movement direction of said flexible member, said electromotor comprising a drive element for engaging and driving said flexible member, longitudinal mounting means having a first longitudinal axis, said mounting means supporting said guide means thereby forming an endless loop of said flexible member, and means for securing said electromotor to said mounting means inside said endless loop, said electromotor having a second longitudinal axis extending in the same direction as said first longitudinal axis of said mounting means (7), said drive element defining a second plane extending perpendicularly to said first plane and perpendicularly to said first and second longitudinal axis, whereby said drive element drives said flexible member crosswise of said longitudinal axis.

2. The linear drive of claim 1, wherein said flexible member is a belt, cable, or rope and said drive element is a pulley driven by said electromotor and supported by said mounting means.

3. The linear drive of claim 1, wherein said drive element is a drive wheel.

4. The linear drive of claim 1, wherein said guide means comprise a plurality of guide members mounted to said mounting means.

5. The linear drive of claim 1, wherein said guide means comprise four guide wheels rotatably mounted to corners of said longitudinal mounting means so that said endless loop of said flexible member is maintained substantially to form a quadrangle with a guide wheel at each corner of said quadrangle.

6. The linear drive of claim 1, wherein said flexible coupling member is a rope that forms several turns around said drive element, whereby said flexible member is secured to said drive element to avoid slippage.

7. The linear drive of claim 1, wherein said guide means comprise a plurality of guide members providing a multiple directional change for said flexible member.

8. The linear drive of claim 1, wherein said runner is rigidly secured to said flexible member.

9. The linear drive of claim 1, wherein said runner carries at least two guide members of said guide means around which said flexible member is guided.

10. The linear drive of claim 1, wherein said runner is an integral element of said flexible member.

11. The linear drive of claim 1, wherein said guide means comprise four guide wheels rotatable mounted to corners of said longitudinal mounting means so that said endless loop of said flexible member is maintained substantially to form a quadrangle with a guide wheel at each corner of said quadrangle, wherein said flexible coupling member is a rope that forms several turns around said drive element, whereby said flexible member is secured to said drive element to avoid slippage, and wherein two guide wheels (6A, 6B) of said four guide wheels (6A, 6B, 6C, 6D) have rotational axes (6A', 6B') positioned on said mounting means relative to said drive element (4) with a lateral spacing (S) between said rotational axis (6A', 6B') so that said rope runs onto said drive element (4) at a first location that is axially spaced from a second location where said rope runs off said drive element (4), said lateral spacing (S) being sufficient to permit formation of said several turns on said drive element.

12. The linear drive of claim 1, wherein said endless loop of said flexible member has a first run (2B) and a second run (2C) spaced from said first run by a spacing, said electromotor being positioned in said spacing.

13. The linear drive of claim 12, wherein said first run, said second run, and said first and second longitudinal axes extend in parallel to each other.

* * * * *

UNITED STATES PATENT AND TRADEMARK OFFICE
CERTIFICATE OF CORRECTION

PATENT NO. : 5,331,862
DATED : July 26, 1994
INVENTOR(S) : Ralf Baginski, Roland Felkai It is certified that error appears in the above-indentified patent and that said Letters Patent is hereby corrected as shown below:

Col. 1, line 59, replace "snarl" by --shaft--.
Col. 2, line 33, replace "fall" by --rail--.
Col. 3, line 29, replace "my" by --by--, replace "an" by --at--;
        line 41, replace "me" by --be--;
        line 55, replace "rode" by --rope--.
Col. 4, line 10, after "other" insert --in a lateral direction--;
        line 68, after "2E." insert --The drive power could be applied between 12E and 12F as in Fig. 1.--.
Col. 5, line  5, after "pulleys" insert --12A, 12B--.

Signed and Sealed this

Twenty-seventh Day of September, 1994

BRUCE LEHMAN

Attest:

Attesting Officer

Commissioner of Patents and Trademarks